Figure 1:
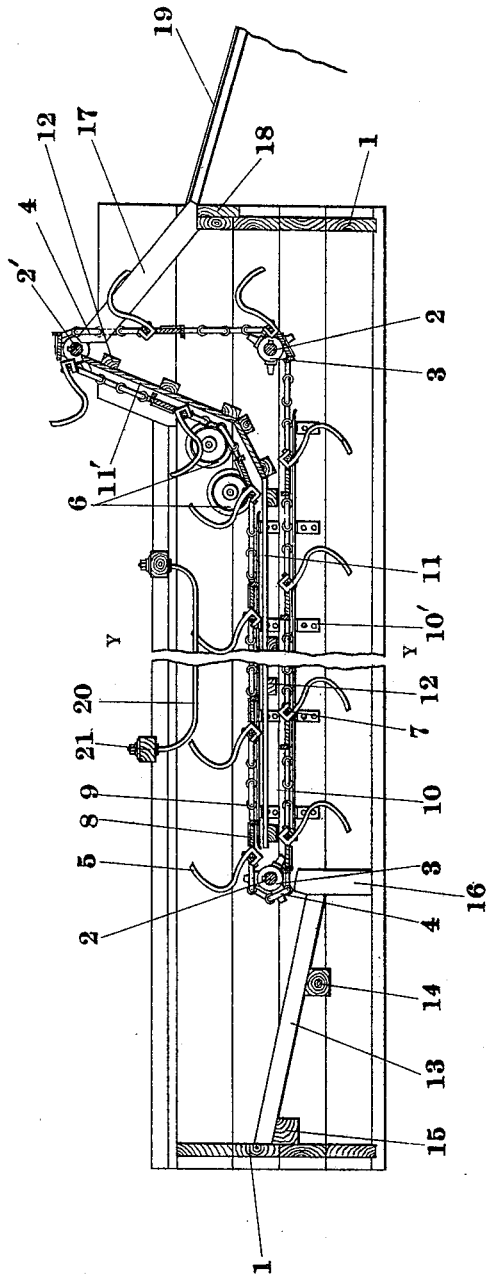

No. 613,191. Patented Oct. 25, 1898.
F. COWIN.
HOG CONVEYER, ELEVATOR AND THROW-OUT FOR SCALDING TANKS.
(Application filed Mar. 22, 1898.)
(No Model.) 3 Sheets—Sheet 1.

WITNESSES
John R. McShane
William E. Griffin

INVENTOR
Frederick Cowin
BY James C. McShane
ATT'Y

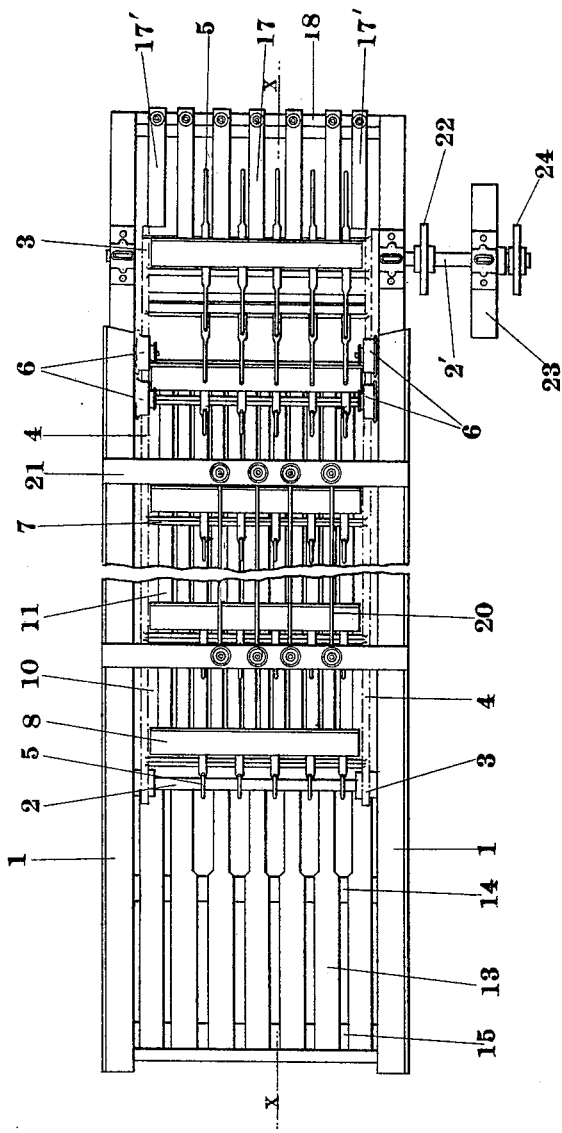

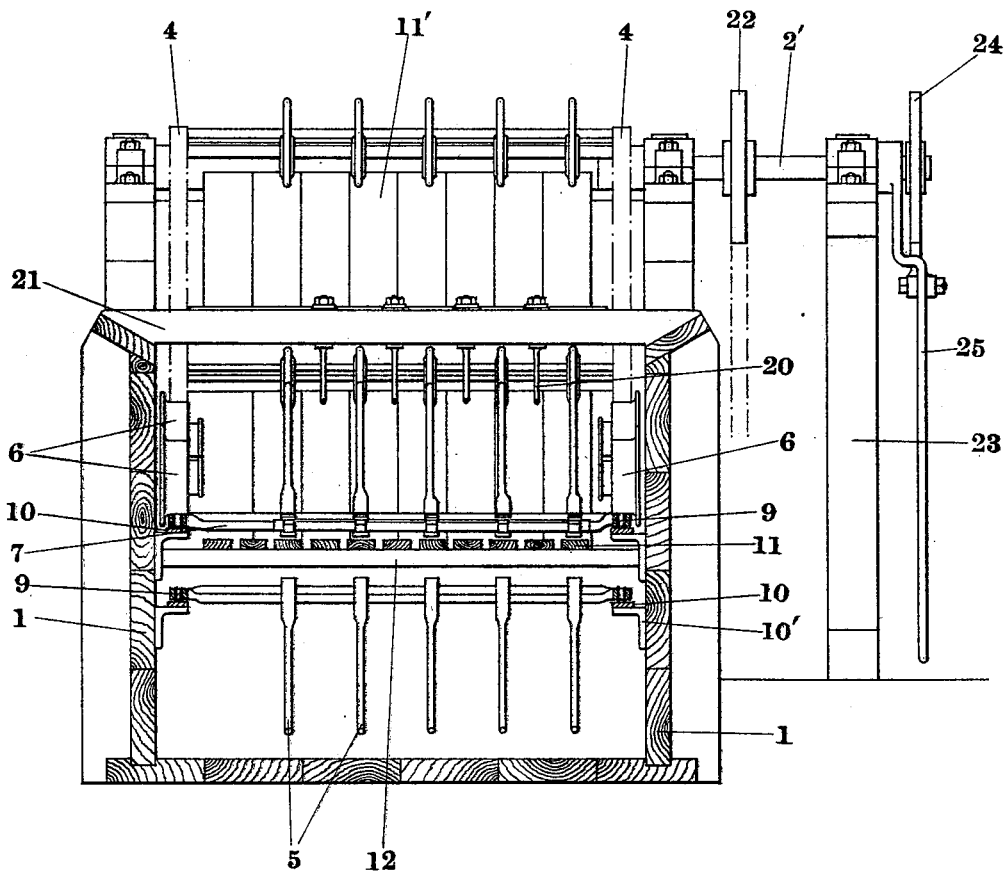

UNITED STATES PATENT OFFICE.

FREDERICK COWIN, OF CHICAGO, ILLINOIS, ASSIGNOR TO THE ANGLO-AMERICAN PROVISION COMPANY, OF ILLINOIS.

HOG CONVEYER, ELEVATOR, AND THROW-OUT FOR SCALDING-TANKS.

SPECIFICATION forming part of Letters Patent No. 613,191, dated October 25, 1898.

Application filed March 22, 1898. Serial No. 674,722. (No model.)

*To all whom it may concern:*

Be it known that I, FREDERICK COWIN, a resident of Chicago, in the county of Cook and State of Illinois, have invented a new and useful Hog Conveyer, Elevator, and Throw-Out for Scalding-Tanks, of which the following is a specification.

The invention designs to provide the tanks used at slaughter-houses for scalding the carcasses of hogs, &c., with conveyer and elevator apparatus by which the carcasses can be automatically conveyed within the tank from the receiving end along through the tank, submerged, and be lifted up and discharged overhead into the delivery-chute or onto the dressing-table at the other end of the tank. I attain these objects by the mechanism illustrated in the accompanying drawings, in which—
Figure 1 is a vertical section of the scalding-tank, conveyer, and elevator apparatus, taken on the line *x x* of Fig. 2. Fig. 2 is a top plan, partly broken away. Fig. 3 is a vertical section on the line *y y* of Fig. 1.
The scalding tank or vat 1 has extending across from side to side and journaled therein the shafts 2 and 2', having thereon the sprocket-wheels 3. The endless carrier-chain 4 is carried by the sprocket-wheels 3 and guided in the position shown by the idlers 6, which are journaled in the tank. The endless chain 4 carries hooks 5 in transverse rows. These are fastened to cross-rods 7 of angular contour, extending between the chains and riveted or otherwise fastened to lugs or ears in opposite links of the chains. Cross-pieces 8 extend between the chains, serving as platforms in front of the hooks 5 to aid the hooks in supporting the body of the hog while being conveyed and elevated. Rollers 9 support the chains on the guides 10, the guides 10 being supported by corner-irons 10', which are fastened by rivets or bolts to the side walls of the tank. Series of strips 11, running lengthwise, are supported on the cross-pieces 12, which are secured to the walls of the tank to aid the chain in supporting the bodies of the animals.

The platform at the receiving end of the conveyer is formed of a series of strips 13, supported on cross-pieces 14 15 and on the standards 16, resting on the rim of the tank.

At the discharge end of the conveyer the platform is formed of a series of arms 17 and 17', extending at a considerable incline into the path of the hooks, which are bolted to the reinforced part 18 of the tank and allow the carcasses to nicely clear the hooks when discharged.

A delivery-platform 19 extends on a slight incline from the base of the arms 17 and 17'. The same is shown broken away in Figs. 1 and 2.

A series of rods 20 are fastened to cross-pieces 21 on the tank and extend longitudinally of the tank, above the horizontal portion of the conveyer, to keep the hogs submerged while being conveyed. These rods 20 are between the hooks 5.

The shaft 2' is the driving-shaft and has thereon the sprocket-wheel 22, through which the conveyer is driven.

Tighteners may be placed at the outside of the tank at the ends of shaft 2'. The shaft 2' is also journaled in the standard 23.

If a carcass becomes jammed or caught in the machinery, it sometimes becomes necessary to reverse the movement of the conveyer far enough to release the carcass. For this purpose shaft 2' carries rigidly a ratchet-wheel 24, with ratchet-lever 25, provided with a pawl by means of which the conveyer may be driven by hand.

In operating the conveyer the hogs are put upon the platform formed by the strips 13 at the receiving end. The same are here lifted by the hooks 5 and rest upon the cross-pieces 8 and chains 4, while they are carried submerged through the tank and to the highest part of the course of the chain at the discharge end, where they are delivered upon the arms 17 17'. The strips 11 form a support for the hogs in case the same should fall forward from the cross-pieces 8. In such case the conveyer will drag the same along the strips 11 until the extension 11' is reached, where the hogs will naturally drop back upon the hooks. The rods 20 prevent the hogs from rising above a certain level while being conveyed through the tank and secure a uniform scalding of the hogs.

Heretofore hog-elevators for scalding-tanks have been placed at one end of the tank or vat and have consisted of the endless carrier-chain provided with hooks operating around two shafts journaled into the tank, one submerged and the other above. In operating the hogs had to be moved or pushed by hand from the different parts of the tank or vat within reach of the arms or hooks of the elevator. The latter merely operated on an incline from above the water down into the water, but was not extended horizontally along the tank.

The upright or elevating portion of Fig. 1 gives in general the method of operation of elevators heretofore.

In my invention the elevating device has been extended along the tank, operating as a conveyer or carrier. It automatically receives the hogs from the chute by which they come into the tank and carries them along the tank, holding them submerged by the horizontal bars above, to the elevating portion of the device at the other end of the tank. Thus by operating the carrier at the desired speed a uniform scalding of each hog for the proper length of time is secured.

What I claim as my invention, and desire to secure by Letters Patent, is—

1. In hog-elevators for scalding-tanks the combination of the upper horizontal sprocket-shaft, two lower sprocket-shafts, submerged and parallel thereto but placed at or near opposite ends of the tank or vat, the endless carrier-chains, mounted upon said shafts, the series of hooks secured in transverse rows between said chains and at intervals about the same, the cross-pieces fastened across the chains in front of the hooks, the series of strips located beneath the upper surface, of the carrier-chains, the series of longitudinal rods located above the horizontal portion of the conveyer, the idlers journaled into the sides of the tanks, and the platforms at the receiving and discharging ends of the conveyer, all substantially as set forth.

2. In hog-elevator for scalding-tanks the combination of the elevating device, consisting of the sprocket-shafts, sprocket-wheels, carrier-chains with series of hooks thereon, cross-pieces in front of the hooks, and series of strips under the upper surface of the conveyer, extending horizontally along and inside of the tank, a series of longitudinal rods above the upper surface of the horizontal portion of the conveyer, the idlers journaled into the side of the tank, and the series of inclined arms or strips forming the receiving and discharging platforms, substantially as described.

3. In hog-elevator for scalding-tanks the combination of the elevating device, consisting of the sprocket-shafts, sprocket-wheels, carrier-chains with series of hooks thereon, cross-pieces in front of the hooks, and series of strips under the upper surface of the conveyer, extending horizontally along and inside of the tank, a series of longitudinal rods above the upper surface of the horizontal extended portion of the conveyer, substantially as described.

FREDERICK COWIN.

Witnesses:
BENJAMIN ROBERT IRVING,
JAMES JOHNS.